United States Patent
McDougall et al.

(10) Patent No.: US 6,701,412 B1
(45) Date of Patent: Mar. 2, 2004

(54) METHOD AND APPARATUS FOR PERFORMING SOFTWARE SAMPLING ON A MICROPROCESSOR CACHE

(75) Inventors: Richard J. McDougall, Menlo Park, CA (US); Denis J. Sheahan, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/352,305

(22) Filed: Jan. 27, 2003

(51) Int. Cl.[7] .............................................. G06F 12/00
(52) U.S. Cl. ..................... 711/118; 711/119; 711/122; 711/123; 711/125; 711/126; 711/147; 714/1; 717/127
(58) Field of Search ................................ 710/260, 266, 710/267; 711/117, 118, 119, 123, 125, 126; 717/147, 127; 714/1

(56) References Cited

U.S. PATENT DOCUMENTS

| | | | | |
|---|---|---|---|---|
| 5,857,097 A | * | 1/1999 | Henzinger et al. | 712/236 |
| 5,918,245 A | * | 6/1999 | Yung | 711/122 |
| 6,112,317 A | * | 8/2000 | Berc et al. | 714/47 |
| 6,263,408 B1 | * | 7/2001 | Anderson et al. | 711/144 |
| 6,378,023 B1 | * | 4/2002 | Christie et al. | 710/260 |
| 6,442,585 B1 | * | 8/2002 | Dean et al. | 709/108 |
| 2002/0116555 A1 | * | 8/2002 | Somers et al. | 710/26 |
| 2002/0194436 A1 | * | 12/2002 | McKenney | 711/152 |
| 2003/0097538 A1 | * | 5/2003 | Hall et al. | 711/201 |

\* cited by examiner

Primary Examiner—Mano Padmanabhan
Assistant Examiner—Jasmine Song
(74) Attorney, Agent, or Firm—Park, Vaughn & Fleming LLP

(57) ABSTRACT

One embodiment of the present invention provides a system that facilitates sampling a cache in a computer system, wherein the computer system has multiple central processing units (CPUs), including a measured CPU containing the cache to be sampled, and a sampling CPU that gathers the sample. During operation, the measured CPU receives an interrupt generated by the sampling CPU, wherein the interrupt identifies a portion of the cache to be sampled. In response to receiving this interrupt, the measured CPU copies data from the identified portion of the cache into a shared memory buffer that is accessible by both the measured CPU and the sampling CPU. Next, the measured CPU notifies the sampling CPU that the shared memory buffer contains the data, thereby allowing the sampling CPU to gather and process the data.

18 Claims, 3 Drawing Sheets

METHOD AND APPARATUS FOR PERFORMING SOFTWARE SAMPLING ON A MICROPROCESSOR CACHE

BACKGROUND

1. Field of the Invention

The present invention relates to techniques for measuring performance within a computer system. More specifically, the present invention relates to a method and an apparatus for performing software sampling on a microprocessor cache within a computer system while the computer system is operating.

2. Related Art

As microprocessor clock speeds continue to increase at an exponential rate, processor performance is becoming increasingly constrained by the delays involved in transferring instructions and data between memory and computational circuitry within the processor core. In order to alleviate this problem, copies of instructions and data items that are likely to be referenced are stored in local cache memories within the microprocessor chip. This allows the microprocessor to access the instructions and data items from the local cache memories, without the significant delay involved in accessing an off-chip main memory.

In order to optimize the performance of these microprocessor caches, it is necessary to measure the dynamic behavior of applications on these microprocessor caches. If this dynamic behavior can be accurately measured, the application developer (or the developer of an associated compiler) can modify the memory layout of the application to optimize the cache performance of the application. Alternatively, the microprocessor designer can adjust the cache structure, the cache size, or the cache replacement policy to optimize cache performance.

A number of techniques are presently being used to monitor cache performance. A hardware analyzer can monitor signal lines in the computer system, and can thereby determine cache performance within the computer system. Unfortunately, a hardware analyzer cannot monitor internal signals lines within the microprocessor chip. It can only monitor signals that are available on I/O pins of the microprocessor chip. Hence, a hardware analyzer is largely unable to monitor the dynamic behavior of on-chip microprocessor caches. Moreover, because of the tremendous clock speeds of modern microprocessors and because of memory limitations within the hardware analyzers, hardware analyzers are typically only able to record a few seconds worth of performance data.

Hardware counters that count cache misses can be incorporated into microprocessor caches. However, these hardware counters merely provide a cache miss rate, and do not indicate the cause of a cache miss.

Some diagnostic programs can determine instruction and data reference patterns for an application by performing trap operations for each instruction the application executes. During these trap operations, program counters and other information can be recorded to determine instruction and data reference patterns, and these reference patterns can be used to determine the dynamic behavior of the application on the microprocessor caches. Unfortunately, this technique is hundreds of times slower that normal execution of the application. Furthermore, this technique cannot be used to monitor system calls and other kernel operations associated with the application. This is a problem because many cache performance problems arise from interactions between the user application and the operating system, and these interactions cannot be detected through these diagnostic programs.

It is also possible to perform software sampling on a microprocessor cache. However, existing techniques for software sampling produce invalid results because the application performing the sampling displaces the application being measured from the microprocessor cache. Hence, the application performing the sampling measures itself rather than the application of interest.

Hence, what is needed is a method and an apparatus for measuring the dynamic behavior of applications on microprocessor caches without the problems of the existing techniques described above.

SUMMARY

One embodiment of the present invention provides a system that facilitates sampling a cache in a computer system, wherein the computer system has multiple central processing units (CPUs), including a measured CPU containing the cache to be sampled, and a sampling CPU that gathers the sample. During operation, the measured CPU receives an interrupt generated by the sampling CPU, wherein the interrupt identifies a portion of the cache to be sampled. In response to receiving this interrupt, the measured CPU copies data from the identified portion of the cache into a shared memory buffer that is accessible by both the measured CPU and the sampling CPU. Next, the measured CPU notifies the sampling CPU that the shared memory buffer contains the data, thereby allowing the sampling CPU to gather and process the data.

In a variation on this embodiment, copying the data from the identified portion of the cache into the shared memory buffer involves saving the data from the identified portion of the cache into one or more registers within the measured CPU, and then storing the data from the one or more registers into the shared memory buffer.

In a further variation, storing the data from the one or more registers into the shared memory buffer involves bypassing a data cache within the measured CPU and storing the data directly into the shared memory buffer.

In a further variation, the one or more registers in the measured CPU are floating point registers. In this variation, prior to saving the data from the identified portion of the cache into the one or more registers, the measured CPU saves existing contents of the one or more registers. After the data is stored from the one or more registers into the shared memory buffer, the measured CPU restores the existing contents of the one or more registers.

In a further variation, prior to saving the data from the identified portion of the cache into the one or more registers, the measured CPU suspends a sampled application running on the measured CPU, and then saves the state of the sampled application into storage within the measured CPU. After the data is stored from the one or more registers into the shared memory buffer, the measured CPU restores the state of the sampled application from the storage within the measured CPU, and then resumes execution of the sampled application on the measured CPU.

In a variation on this embodiment, the data from the identified portion of the cache includes cache tag information associated with specified lines within the cache. Moreover, this cache tag information contains address and ownership information for the specified lines within the cache.

In a variation on this embodiment, the cache to be sampled in the measured CPU can include: an instruction cache, a data cache, a level-two (L2), a prefetch cache, a write cache, an instruction translation lookaside buffer (TLB), a data TLB, and a branch prediction table.

In a variation on this embodiment, there exists a different interrupt handling routine for each different cache that can be sampled within the measured CPU. Furthermore, the interrupt identifies a specific cache to be sampled within the measured CPU.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
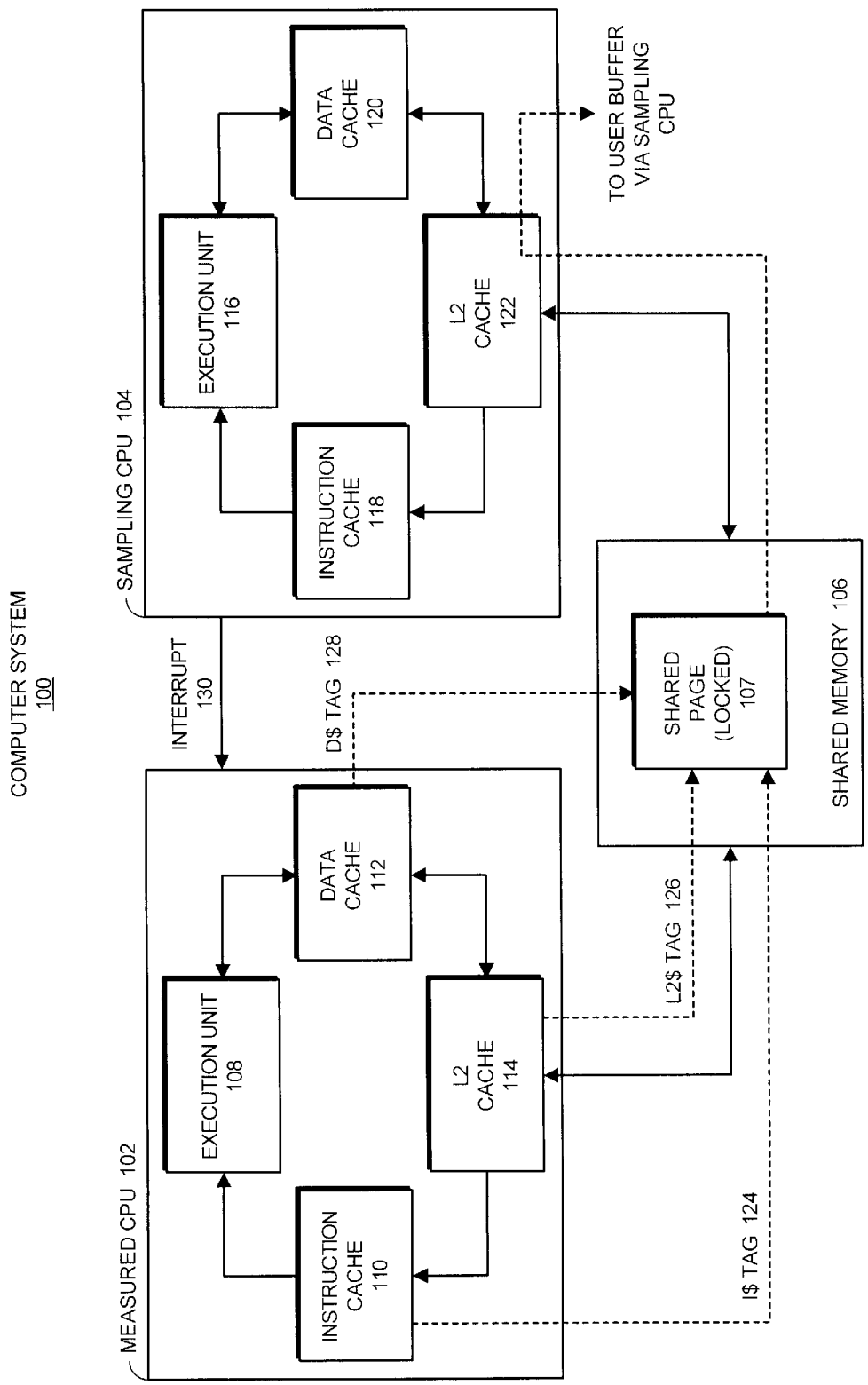
FIG. 1 illustrates a computer system with multiple CPUs in accordance with an embodiment of the present invention.

FIG. 1 illustrates a computer system 100 with multiple CPUs 102 and 104 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 includes measured CPU 102, which executes an application-to-be-tested, and sampling CPU 104, which monitors the cache performance of the application-to-be-tested running on measured CPU 102. Note that although the example illustrated in FIG. 1 includes two CPUs, in general computer system 100 can include more that two CPUs.

Measured CPU includes an execution unit 108, which retrieves instructions from instruction cache 110 and performs operations on data items from data cache 112. Instruction cache 110 and data cache 112 operate on copies of cache lines from level two (L2) cache 114. L2 cache 114 in turn operates on copies of cache lines from shared memory 106. Note that sampling CPU 104 similarly includes an instruction cache 118, a data cache 120 and an L2 cache 122.

Measured CPU 102 and sampling CPU 104 both access shared memory 106, which comprises the main memory of computer system 100. In particular, measured CPU 102 and sampling CPU 104 both access a shared page 107, which is located in shared memory 106.

Note that measured CPU 102 and sampling CPU 104 can communicate with shared memory 106 through a communication channel, such as a shared bus. Additionally, sampling CPU 104 can send an interrupt 130 to measured CPU 102 through another communication channel (which is not shown).

During the performance monitoring process, sampling CPU 104 periodically sends an interrupt 130 to measured CPU 102. This interrupt 130 causes measured CPU 102 to execute code that copies tag information (and possibly other information) from instruction cache 110, data cache 112 and L2 cache 114 into the shared page 107 in shared memory 106. Sampling CPU 104 then copies this tag information into a user buffer for post-processing. This performance monitoring process is described in more detail below with reference to FIGS. 3–4.

Caches

Figure 2:
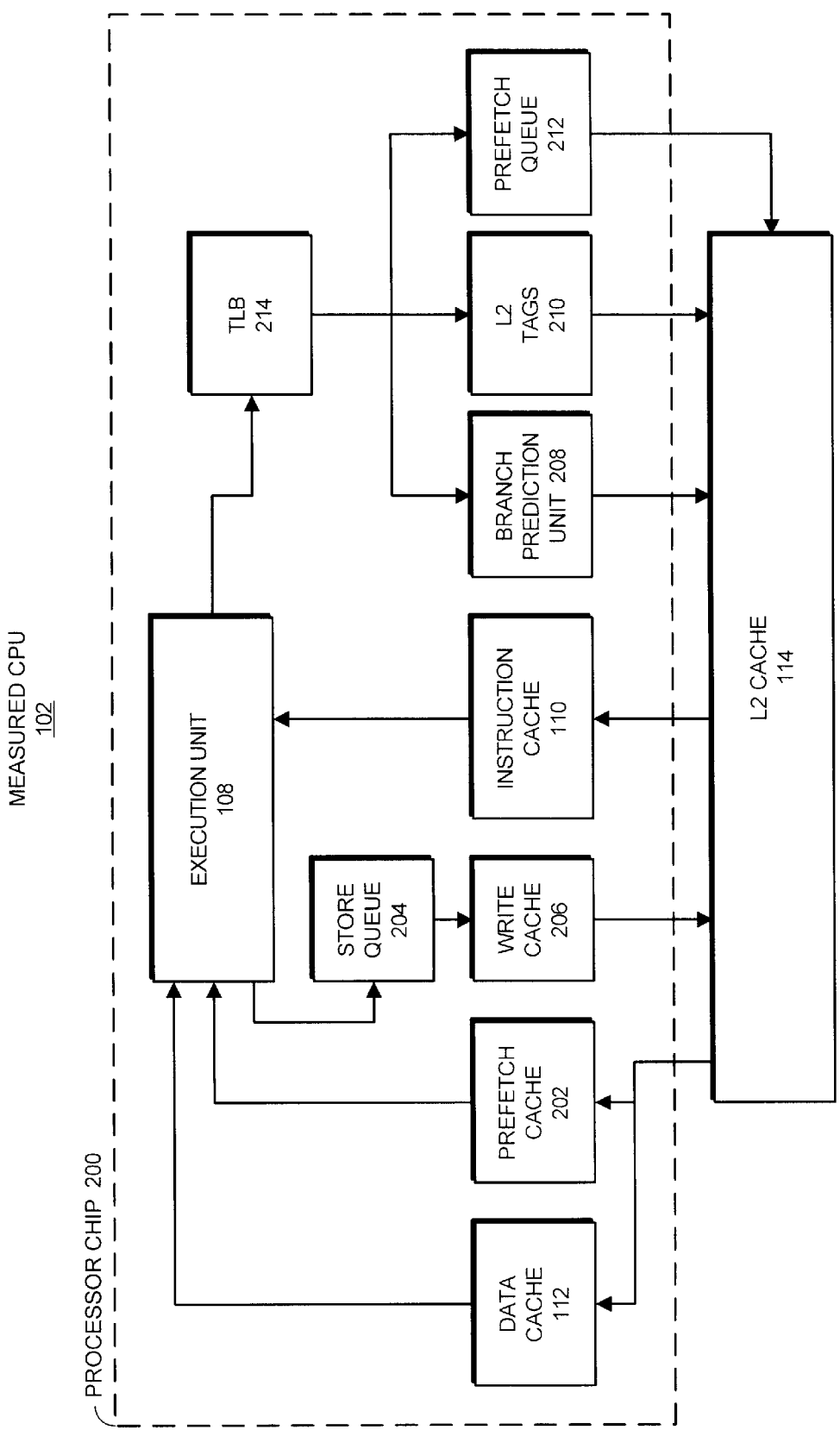
FIG. 2 illustrates various caches within a CPU in accordance with an embodiment of the present invention.

FIG. 2 illustrates various caches that can be sampled within measured CPU 102 in accordance with an embodiment of the present invention. As is illustrated in FIG. 2, execution unit 108 and a number of caches 110, 112, 202, 206, 208, 212 and 214 are located on a processor chip 200. These caches include instruction cache 110 and data cache 112, which were described above with reference to FIG. 1. They also include a prefetch cache 202, which stores prefetched data for execution unit 108.

Store operations performed by execution unit 108 pass through a store queue 204 and then a write cache 206, which aggregates the store operations before storing the data to L2 cache 114.

Furthermore, addresses generated by execution unit 108 pass through translation lookaside buffer 214, which caches virtual-to-physical address translations. The output of TLB 214 feeds into branch prediction unit 208, L2 tags 210 and prefetch queue 212. Note that the tag portion 210 of L2 cache 114 is located on processor chip 200, while the data array and other portions of L2 cache 114 are located outside of processor chip 200.

During the performance monitoring process, any of the caches or hardware structures illustrated in FIG. 2 can be monitored as is described below with reference to FIGS. 3–4.

Operations Performed by the Sampling CPU

Figure 3:
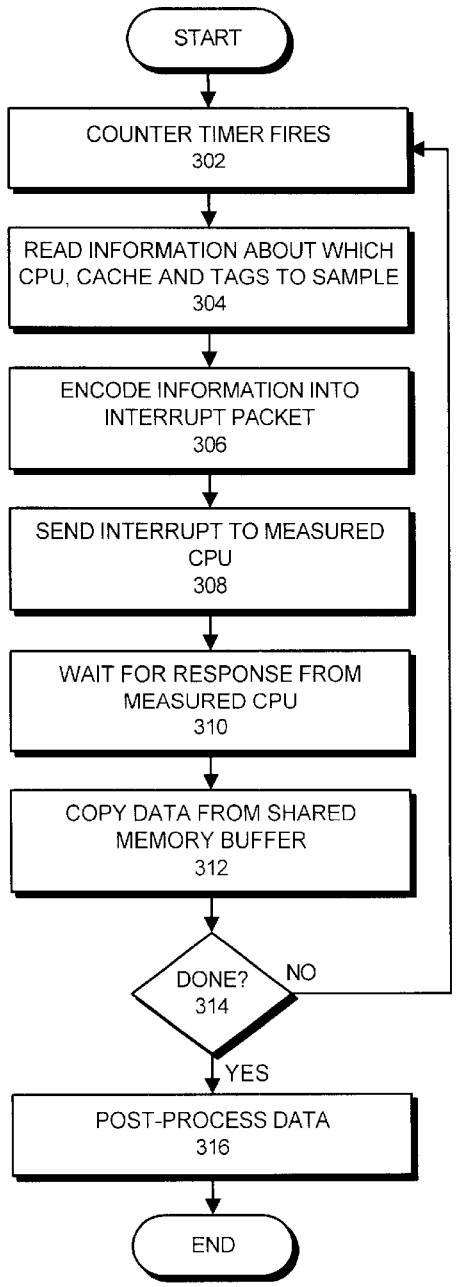
FIG. 3 presents a flow chart illustrating operations performed by the sampling CPU in accordance with an embodiment of the present invention.

FIG. 3 presents a flow-chart illustrating operations performed by a system within sampling CPU 104 during the performance monitoring process in accordance with an embodiment of the present invention. During the performance monitoring process, a counter timer periodically fires (step 302), for example every 20 microseconds, and this causes a number of actions to occur.

The system first reads information specifying which CPU, which cache and which tags to sample (step 304). For example, this information may be stored in a data structure within sampling CPU 104.

Next, the system encodes the information into the interrupt packet (step 306), and then sends the interrupt 130 to measured CPU 102 (step 308). The system then waits for a response from measured CPU 102 (step 310). This can involve, for example, periodically polling (spinning on) a location in shared memory 106.

When a successful response is received from measured CPU 102, the system copies tag data from shared page 107 within shared memory 106 into a user buffer (step 312). Next, the system determines if the monitoring process is complete, which may for example involve examining a counter (step 314). If not, the system returns to step 302 to retrieve more tag information.

On the other hand, if the performance monitoring process is complete, the system post-processes the data as necessary (step 316) and then either terminates or returns to step 302 to commence a new sampling process.

For example, in order to sample an entire cache, the performance monitoring process can sample a set of eight cache lines 50,000 times, and can then repeatedly sample the next set of eight cache lines 50,000 times, until all of the lines in the cache have been sampled. The process of repeatedly sampling the same set of cache lines allows state changes, such as cache line replacements, to be detected in the set of cache lines.

Operations Performed by the Measured CPU

Figure 4:
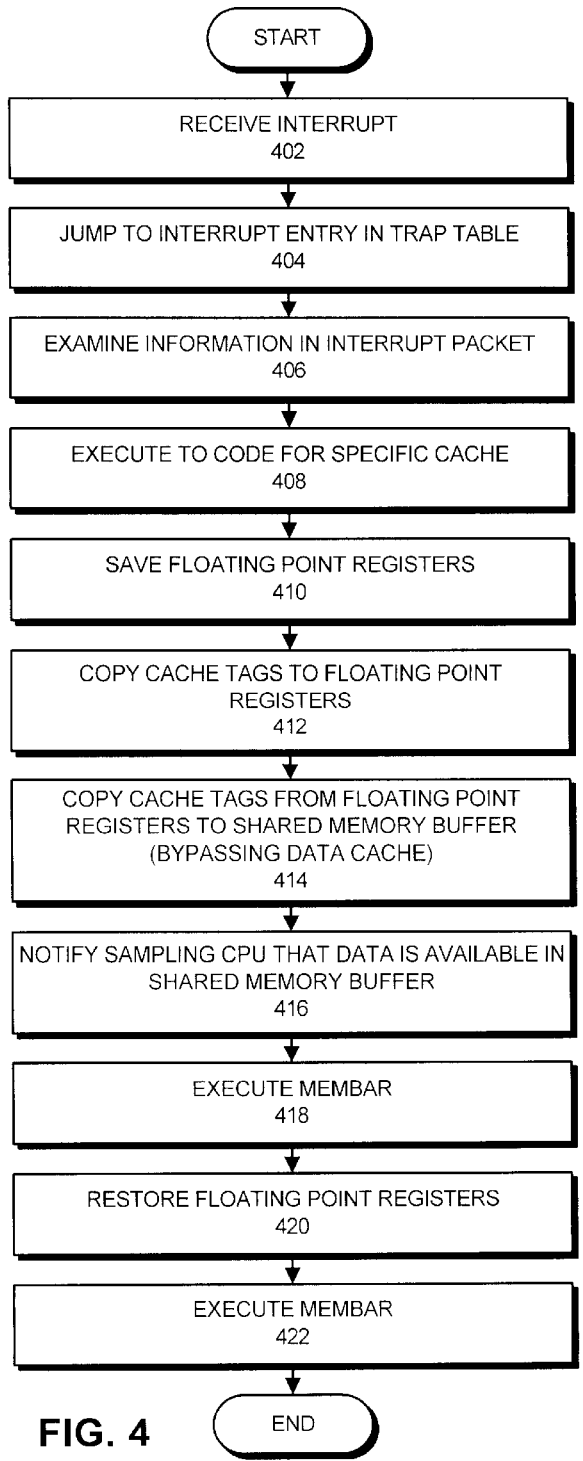
FIG. 4 presents a flow chart illustrating operations performed by the measured CPU in accordance with an embodiment of the present invention.

FIG. 4 presents a flow chart illustrating operations performed by the measured CPU 102 during the performance monitoring process in accordance with an embodiment of the present invention. The system first receives an interrupt from sampling CPU 104 (step 402).

Note that before the interrupt executes, the system suspends execution of a sampled application running on the measured CPU, and then saves the state of the sampled application into storage within the measured CPU rather than saving the state in memory, which would displace lines being measured from the data cache. After the interrupt is complete, the system restores the state of the sampled application from the storage within the measured CPU, and then resumes execution of the sampled application on the measured CPU.

In response to receiving the interrupt, a system within measured CPU 102 performs a number of actions. First, the system jumps to an interrupt entry in a trap table in measured CPU 102 (step 404). Next, the system examines the information encoded in the interrupt packet to determine which cache to monitor (step 406). The system then executes code to monitor the specific cache (step 408). This code causes the system to save the contents of one or more floating-point registers within the measured CPU 102 (step 410). The contents of these floating-point registers can be saved to storage within measured CPU 102 or to an external memory.

Next, the system copies the specified tag information (possibly with other non-tag information) to the floating-point registers (step 412). For example, this may involve executing a series of load operations to load data from the cache tags into the floating-point registers.

The system then copies the cache tags from the floating-point registers into shared page 107 within shared memory 106 (step 414). In doing so, the system can use a special store instruction, which bypasses data cache 112 and L2 cache 114 and stores the cache tags directly into shared memory 106. (Special store instructions of this type are commonly provided for graphics-related operations that do not benefit from caching.)

Next, the system notifies sampling CPU 104 that the tag information is waiting in shared page 107 (step 416). This notification can be accomplished, for example, by changing a location within shared page 107 that sampling CPU 104 is periodically polling. The system then executes a memory barrier (membar) operation, if necessary, to flush the store queue, thereby ensuring that the store operations take place (step 418).

Next, the system restores the floating pointer registers to their original values (step 420) and executes another membar operation (step 422).

Note that the probe effect of the above-described sampling process is very small. This is because the code that monitors the cache is very small and hence displaces very few lines in instruction cache 110. Additionally, the tag information bypasses the data cache 112 as it moves into shared memory 106 and therefore does not displace lines in data cache 102. Furthermore, the kernel code involved in the monitoring process can be pinned in the instruction cache 110 so that no TLB misses are generated by the monitoring process. This means that the monitoring process has a near-zero footprint. Hence, the monitoring process has a minimal impact on the performance of the caches that are being monitored.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for sampling a cache in a computer system, wherein the computer system has multiple central processing units (CPUs), including a measured CPU containing the cache to be sampled, and a sampling CPU that gathers the sample, the method comprising:

receiving an interrupt generated by the sampling CPU at the measured CPU, wherein the interrupt identifies a portion of the cache to be sampled; and in response to receiving the interrupt, copying data from the identified portion of the cache into a shared memory buffer that is accessible by both the measured CPU and the sampling CPU, wherein copying the data from the identified portion of the cache into the shared memory buffer involves:

saving the data from the identified portion of the cache into one or more registers within the measured CPU, storing the data from the one or more registers into the shared memory buffer, and notifying the sampling CPU that the shared memory buffer contains the data, thereby allowing the sampling CPU to gather and process the data, wherein prior to saving the data from the identified portion of the cache into the one or more registers the method further comprises saving existing contents of the one or more registers, and wherein after the data is stored from the one or more registers into the shared memory buffers, the method further comprises restoring the existing contents of the one or more registers.

2. The method of claim 1, wherein storing the data from the one or more registers into the shared memory buffer involves bypassing a data cache within the measured CPU and storing the data directly into the shared memory buffer.

3. The method of claim 1, wherein prior to saving the data from the identified portion of the cache into the one or more registers, the method further comprises, suspending a sampled application running on the measured CPU, and
saving the state of the sampled application into storage within the measured CPU; and
wherein after the data is stored from the one or more registers into the shared memory buffer, the method further comprises,
restoring the state of the sampled application from the storage within the measured CPU, and
resuming execution of the sampled application on the measured CPU.

4. The method of claim 1,
wherein the data from the identified portion of the cache includes cache tag information associated with specified lines within the cache; and
wherein the cache tag information contains address and ownership information for the specified lines within the cache.

5. The method of claim 1, wherein the cache to be sampled in the measured CPU can include:
an instruction cache;
a data cache;
a level-two (L2);
a prefetch cache;
a write cache;
an instruction translation lookaside buffer (TLB);
a data TLB; and
a branch prediction table.

6. The method of claim 1,
wherein there exists a different interrupt handling routine for each different cache that can be sampled within the measured CPU; and
wherein the interrupt identifies a specific cache to be sampled within the measured CPU.

7. A computer-readable storage medium storing instructions that when executed by a computer cause the computer to perform a method for sampling a cache in a computer system, wherein the computer system has multiple central processing units (CPUs), including a measured CPU containing the cache to be sampled, and a sampling CPU that gathers the sample, the method comprising:
receiving an interrupt generated by the sampling CPU at the measured CPU, wherein the interrupt identifies a portion of the cache to be sampled; and
in response to receiving the interrupt,
copying data from the identified portion of the cache into a shared memory buffer that is accessible by both the measured CPU and the sampling CPU, wherein copying the data from the identified portion of the cache into the shared memory buffer involves:
saving the data from the identified portion of the cache into one or more registers within the measured CPU, and
storing the data from the one or more registers into the shared memory buffer, and
notifying the sampling CPU that the shared memory buffer contains the data, thereby allowing the sampling CPU to gather and process the data,
wherein prior to saving the data from the identified portion of the cache into the one or more registers, the method further comprises saving existing contents of the one or more registers, and
wherein after the data is stored from the one or more registers into the shared memory buffer, the method further comprises restoring the existing contents of the one or more registers.

8. The computer-readable storage medium of claim 7, wherein storing the data from the one or more registers into the shared memory buffer involves bypassing a data cache within the measured CPU and storing the data directly into the shared memory buffer.

9. The computer-readable storage medium of claim 7,
wherein prior to saving the data from the identified portion of the cache into the one or more registers, the method further comprises,
suspending a sampled application running on the measured CPU, and
saving the state of the sampled application into storage within the measured CPU; and
wherein after the data is stored from the one or more registers into the shared memory buffer, the method further comprises,
restoring the state of the sampled application from the storage within the measured CPU, and
resuming execution of the sampled application on the measured CPU.

10. The computer-readable storage medium of claim 7,
wherein the data from the identified portion of the cache includes cache tag information associated with specified lines within the cache; and
wherein the cache tag information contains address and ownership information for the specified lines within the cache.

11. The computer-readable storage medium of claim 7, wherein the cache to be sampled in the measured CPU can include:
an instruction cache;
a data cache;
a level-two (L2);
a prefetch cache;
a write cache;
an instruction translation lookaside buffer (TLB);
a data TLB; and
a branch prediction table.

12. The computer-readable storage medium of claim 7,
wherein there exists a different interrupt handling routine for each different cache that can be sampled within the measured CPU; and
wherein the interrupt identifies a specific cache to be sampled within the measured CPU.

13. An apparatus that samples a cache in a computer system, wherein the computer system has multiple central processing units (CPUs), including a measured CPU containing the cache to be sampled, and a sampling CPU that gathers the sample, the apparatus comprising:
an interrupt handler configured to receive an interrupt generated by the sampling CPU at the measured CPU, wherein the interrupt identifies a portion of the cache to be sampled; and
a cache sampling mechanism, wherein in response to receiving the interrupt, the cache sampling mechanism is configured to,
copy data from the identified portion of the cache into a shared memory buffer that is accessible by both the measured CPU and the sampling CPU, wherein copying the data from the identified portion of the cache into the shared memory buffer involves:
saving the data from the identified portion of the cache into one or more registers within the measured CPU, and storing the data from the one or more registers into the shared memory buffer, and to notify the sampling CPU that the shared memory buffer contains the data, thereby allowing the sampling CPU to gather and process the data, wherein prior to saving the data from the identified portion of the cache into the one or more registers, the method further comprises saving existing contents of the one or more registers, and wherein after the data is stored from the one or more registers into the shared memory buffer, the method further comprises restoring the existing contents of the one or more registers.

14. The apparatus of claim 13, wherein while storing the data from the one or more registers into the shared memory buffer, the cache sampling mechanism is configured to bypass a data cache within the measured CPU and to store the data directly into the shared memory buffer.

15. The apparatus of claim 13, wherein prior to triggering the cache sampling mechanism, the interrupt handler is configured to, suspend a sampled application running on the measured CPU, and to save the state of the sampled application into storage within the measured CPU; and wherein after the cache sampling mechanism has gathered a sample, the interrupt handler is configured to, restore the state of the sampled application from the storage within the measured CPU, and to resume execution of the sampled application on the measured CPU.

16. The apparatus of claim 13, wherein the data from the identified portion of the cache includes cache tag information associated with specified lines within the cache; and wherein the cache tag information contains address and ownership information for the specified lines within the cache.

17. The apparatus of claim 13, wherein the cache to be sampled in the measured CPU can include:

an instruction cache;

a data cache;

a level-two (L2);

a prefetch cache;

a write cache;

an instruction translation lookaside buffer (TLB);

a data TLB; and a branch prediction table.

18. The apparatus of claim 13, wherein there exists a different interrupt handling routine for each different cache that can be sampled within the measured CPU; and wherein the interrupt identifies a specific cache to be sampled within the measured CPU.

* * * * *